(No Model.)
F. HIGGINS.
LATHE CHUCK.
No. 403,589. Patented May 21, 1889.
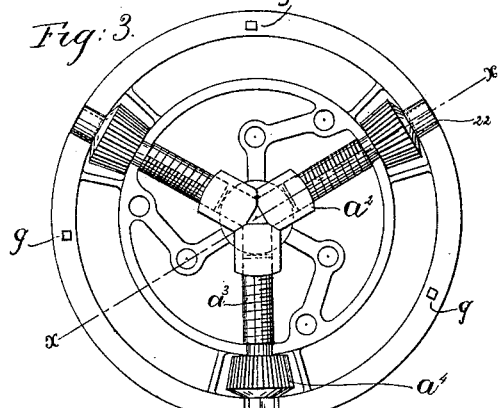
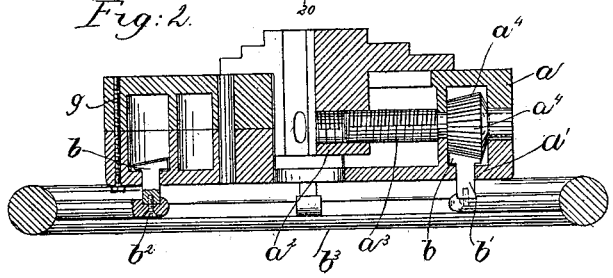
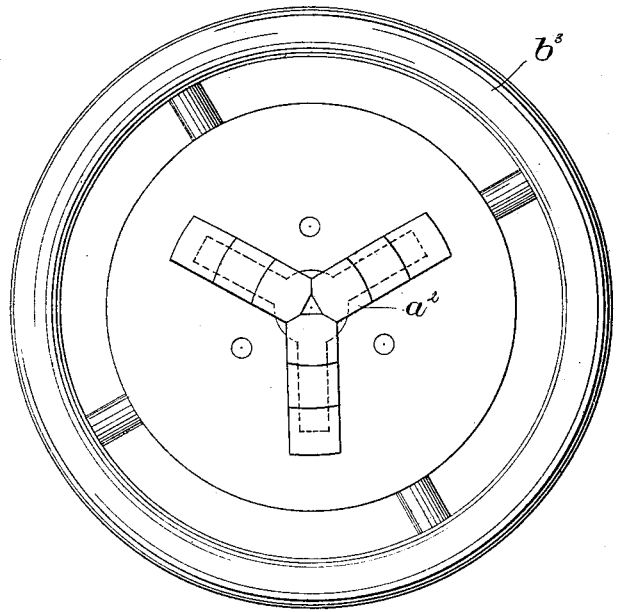
Witnesses.
Howard F. Eaton.
Fredrick L. Emery.
Inventor.
Freeman Higgins,
by Crosby & Gregory
Attys.

United States Patent Office.

FREEMAN HIGGINS, OF MANCHESTER, NEW HAMPSHIRE.

LATHE-CHUCK.

SPECIFICATION forming part of Letters Patent No. 403,589, dated May 21, 1889.

Application filed January 12, 1889. Serial No. 296,131. (No model.)

*To all whom it may concern:*

Be it known that I, FREEMAN HIGGINS, of Manchester, county of Hillsborough, State of New Hampshire, have invented an Improvement in Chucks, of which the following description, in connection with the accompanying drawings, is a specification, like letters on the drawings representing like parts.

This invention in lathe-chucks is an improvement upon the chuck shown and described in United States Patent No. 216,766, dated June 24, 1879, and has for its object to construct lathe-chucks, as will be described, whereby the jaws of the said chuck may be readily operated simultaneously in either direction, thus effecting a very considerable saving in time in operating the chuck.

In accordance with my invention the circular rack-bar, in mesh with the pinions on the screws which operate the jaws of the chuck, is provided on its back with preferably a number of studs or lugs extended through slots in the case, and to which a hand-wheel is secured, so that by a slight rotation of the hand-wheel in opposite directions the jaws may be opened and closed simultaneously.

My invention therefore consists in the combination, with the jaws, screws to operate them, and pinions on said screws, of a rack-bar permanently engaged or in mesh with said pinions, and the hand-wheel secured to said rack-bar to produce simultaneous movement of the said jaws, substantially as will be described.

Figure 1 is a top or plan view of my improved lathe-chuck; Fig. 2, a transverse section on line $x\,x$, Fig. 3; and Fig. 3, an under side view of the cover or upper part of the casing removed.

The inclosing-case composed of the parts $a\,a'$, the jaws $a^2$, the screws $a^3$ inserted into a nut on said jaws and each provided with a pinion, $a^4$, is and may be substantially such as shown and described in the patent referred to. The part $a'$ of the inclosing-case is provided with an annular groove or channel, in which is located an annular rack, $b$, provided preferably with a number of lugs or projections, $b'$, extended out through the part $a'$, and to which is secured, as by screws $b^2$, a hand-wheel, $b^3$.

In operation the jaws of the chuck may be rapidly opened to receive a piece of work by turning the hand-wheel in one direction, and again closed to grip the work and hold it securely by turning the hand-wheel in the opposite direction, thus effecting a very considerable saving of time in operating the chuck.

The parts $a\,a'$ are suitably pinned together. The parts $a\,a'$ are held together, as herein shown, by suitable screw-threaded bolts $g$.

I claim—

The combination, with the jaws, screws to operate them, and pinions on said screws, of the rack-bar in mesh with said pinions, and the hand-wheel secured to said rack-bar, whereby the said jaws may be operated simultaneously, substantially as described.

In testimony whereof I have signed my name to this specification in the presence of two subscribing witnesses.

FREEMAN HIGGINS.

Witnesses:
GEO. W. GREGORY,
BLANCHE DEWAR.